United States Patent
Uehara et al.

(10) Patent No.: US 12,024,619 B2
(45) Date of Patent: Jul. 2, 2024

(54) RUBBER COMPOSITIONS

(71) Applicant: KURARAY CO., LTD., Okayama (JP)

(72) Inventors: Yosuke Uehara, Tokyo (JP); Kei Hirata, Tokyo (JP)

(73) Assignee: KURARAY CO., LTD., Okayama (JP)

( * ) Notice: Subject to any disclaimer, the term of this patent is extended or adjusted under 35 U.S.C. 154(b) by 760 days.

(21) Appl. No.: 17/255,429

(22) PCT Filed: Jun. 21, 2019

(86) PCT No.: PCT/JP2019/024631
§ 371 (c)(1),
(2) Date: Dec. 23, 2020

(87) PCT Pub. No.: WO2020/004243
PCT Pub. Date: Jan. 2, 2020

(65) Prior Publication Data
US 2021/0139679 A1    May 13, 2021

(30) Foreign Application Priority Data

Jun. 29, 2018 (JP) .................. 2018-124664

(51) Int. Cl.
*C08K 3/04* (2006.01)
*C08K 5/14* (2006.01)
*C08L 9/00* (2006.01)
*C08L 15/00* (2006.01)

(52) U.S. Cl.
CPC .............. *C08L 15/005* (2013.01); *C08K 3/04* (2013.01); *C08K 5/14* (2013.01); *C08L 9/00* (2013.01); *C08L 2312/02* (2013.01)

(58) Field of Classification Search
CPC ...... C08L 9/00; C08L 9/02; C08L 9/06; C08L 15/005
See application file for complete search history.

(56) References Cited

FOREIGN PATENT DOCUMENTS

| | | | |
|---|---|---|---|
| EP | 0812881 A1 | * | 12/1997 |
| JP | S58118372 A | | 7/1983 |
| JP | S6346241 A | | 2/1988 |
| JP | H5346140 A | | 12/1993 |
| JP | 20023648 A | | 1/2002 |
| JP | 2004315615 A | | 11/2004 |
| JP | 2007139183 A | | 6/2007 |
| JP | 2010253737 A | | 11/2010 |
| JP | 2017122140 A | | 7/2017 |

OTHER PUBLICATIONS

JP2017122140 machine translation (Year: 2023).*
Office Action in JP Application No. 2020-527469 dated Jun. 21, 2022, 2pp.
International Search Report in PCT Application No. PCT/JP2019/024631, dated Aug. 13, 2019, 4pp.
Written Opinion in PCT Application No. PCT/JP2019/024631, dated Aug. 13, 2019, 13pp.

* cited by examiner

*Primary Examiner* — Marc S Zimmer
*Assistant Examiner* — Jeffrey S Lenihan
(74) *Attorney, Agent, or Firm* — HAUPTMAN HAM, LLP

(57) ABSTRACT

The invention provides a peroxide crosslinkable rubber composition including a hydrogenated nitrile rubber that is enhanced in scorch stability without deterioration in superior characteristics of crosslinked products of the composition. The invention also provides a crosslinked product of such a rubber composition. The rubber composition includes 100 parts by mass of a hydrogenated nitrile rubber (A), 5 to 100 parts by mass of a filler (B), 1 to 10 parts by mass of an organic peroxide (C), and 1 to 20 parts by mass of a liquid diene rubber (D) having a polystyrene-equivalent weight average molecular weight of 3,000 to 120,000 as measured by gel permeation chromatography (GPC).

3 Claims, No Drawings

RUBBER COMPOSITIONS

RELATED APPLICATIONS

The present application is a National Phase of International Application No. PCT/JP2019/024631, filed Jun. 21, 2019 and claims priority based on Japanese Patent Application No. 2018-124664, filed Jun. 29, 2018.

TECHNICAL FIELD

The present invention relates to rubber compositions.

BACKGROUND ART

Hydrogenated nitrile rubbers are conventionally known as having excellent chemical resistance and heat resistance, and are used in various applications such as gaskets, O-rings, oil seals, hoses and belts. To improve properties of compositions including hydrogenated nitrile rubbers and of crosslinked products obtained from the compositions, studies are underway on compositions that include a hydrogenated nitrile rubber and a low-molecular weight liquid diene rubber.

For example, Patent Literature 1, directed to improving the roll processability of a rubber composition, discloses a composition including a hydrogenated nitrile rubber and a low-molecular weight (average molecular weight: about 1000 to 3000) liquid polybutadiene. Further, Patent Literature 2 is aimed at enhancing foaming resistance and the adhesion with respect to metal members coated with a phenolic adhesive, and discloses a composition including a nitrile rubber with a low iodine value and a low-molecular weight (average molecular weight: about 1000 to 3000) liquid polybutadiene with a high degree of vinylation.

CITATION LIST

Patent Literature

Patent Literature 1: JP-A-S63-046241
Patent Literature 2: JP-A-2002-003648

SUMMARY OF INVENTION

Technical Problem

Crosslinked products that are obtained from a composition containing a hydrogenated nitrile rubber are materials with excellent chemical resistance and heat resistance. Unfortunately, no techniques have been established for obtaining a peroxide crosslinkable composition including a hydrogenated nitrile rubber in such a manner that the scorch stability of the composition is enhanced without impairing the superior characteristics of crosslinked products obtained from the composition.

The present invention has been made in light of the circumstances discussed above, and provides a peroxide crosslinkable rubber composition including a hydrogenated nitrile rubber that is enhanced in scorch stability without deterioration in superior characteristics of crosslinked products of the composition. The present invention also provides a crosslinked product of such a rubber composition.

SOLUTION TO PROBLEM

As a result of extensive studies, the present inventors have found that a rubber composition that includes in a specific ratio a hydrogenated nitrile rubber, a filler, an organic peroxide and a liquid diene rubber with a specific molecular weight can attain enhanced scorch stability without deterioration in superior characteristics possessed by a crosslinked product of the hydrogenated nitrile rubber. The present invention has been completed based on the finding.

Specifically, the present invention pertains to the following [1] to [3].

[1] A rubber composition including 100 parts by mass of a hydrogenated nitrile rubber (A), 5 to 100 parts by mass of a filler (B), 1 to 10 parts by mass of an organic peroxide (C), and 1 to 20 parts by mass of a liquid diene rubber (D) having a polystyrene-equivalent weight average molecular weight of 3,000 to 120,000 as measured by gel permeation chromatography (GPC).

[2] The rubber composition described in [1], wherein the liquid diene rubber (D) has a vinyl bond content of not more than 70 mol %.

[3] A crosslinked product of the rubber composition described in [1] or [2].

ADVANTAGEOUS EFFECTS OF INVENTION

The rubber compositions containing a hydrogenated nitrile rubber according to the present invention attain enhanced scorch stability. The rubber compositions can give crosslinked products without deterioration in superior characteristics of the crosslinked hydrogenated nitrile rubber.

DESCRIPTION OF EMBODIMENTS

[Hydrogenated Nitrile Rubbers (A)]

A hydrogenated nitrile rubber (A) used in a rubber composition of the present invention is a rubber that is obtained by hydrogenating an acrylonitrile-butadiene copolymer rubber and can be handled as a solid at 20° C. The Mooney viscosity $ML_{1+4}$ of the hydrogenated nitrile rubber (A) at 100° C. is usually in the range of 20 to 200, preferably in the range of 55 to 100, and more preferably in the range of 65 to 95.

The iodine value of the hydrogenated nitrile rubber (A) is preferably 3 to 50 (mg/100 mg), and more preferably 5 to 40 (mg/100 mg).

The content of acrylonitrile units in the hydrogenated nitrile rubber is preferably 15 to 60 mass %, and more preferably 30 to 55 mass %.

[Fillers (B)]

Examples of fillers (B) used in the rubber compositions of the present invention include inorganic fillers such as carbon blacks, silicas, clays, micas, calcium carbonate, magnesium hydroxide, aluminum hydroxide, barium sulfate, titanium oxides, glass fibers, fibrous fillers and glass balloons; and organic fillers such as resin particles, wood powders and cork powders. By adding these fillers to the rubber composition, it is possible to improve properties such as mechanical strength, heat resistance and weather resistance, to control the hardness, and to increase the bulkiness of the rubber.

Among the above fillers (B), carbon blacks and silicas are preferable from points of view such as improvements in properties, for example, enhancements in mechanical strength.

Examples of the carbon blacks include furnace blacks, channel blacks, thermal blacks, acetylene blacks and Ketjen blacks. From the points of view of enhancing the crosslinking rate and enhancing the mechanical strength, furnace blacks are preferable among the above carbon blacks. The carbon blacks may be used singly, or two or more may be used in combination.

To attain enhancements in properties such as dispersibility, mechanical strength and hardness, the average particle diameter of the carbon black is preferably 5 to 100 nm, more preferably 5 to 80 nm, and still more preferably 5 to 70 nm.

The average particle diameter of the carbon black may be determined by measuring the diameters of the particles with a transmission electron microscope and calculating the average of the diameters.

Examples of the commercially available furnace blacks include "DIABLACK" manufactured by Mitsubishi Chemical Corporation and "SEAST" manufactured by Tokai Carbon Co., Ltd. Examples of the commercially available acetylene blacks include "DENKA BLACK" manufactured by Denka Company Limited. Examples of the commercially available Ketjen blacks include "ECP600JD" manufactured by Lion Specialty Chemicals Co., Ltd.

To attain enhancements in properties such as the wettability and dispersibility with respect to the hydrogenated nitrile rubber (A), the carbon black may be treated with an acid such as nitric acid, sulfuric acid, hydrochloric acid or a mixture of these acids, or may be subjected to surface oxidation treatment by heating in the presence of air. To enhance the mechanical strength of the rubber composition of the present invention and of crosslinked products obtained from the composition, the carbon black may be heat treated at 2,000 to 3,000° C. in the presence of a graphitization catalyst. Preferred examples of the graphitization catalysts include boron, boron oxides (for example, $B_2O_2$, $B_2O_3$, $B_4O_3$ and $B_4O_5$), boron oxoacids (for example, orthoboric acid, metaboric acid and tetraboric acid) and salts thereof, boron carbides (for example, $B_4C$ and $B_6C$), boron nitride (BN) and other boron compounds.

The carbon black may be used after its grain size is controlled by a technique such as crushing. Examples of the grinders which may be used for the crushing of the carbon blacks include high-speed rotary crushers (hammer mills, pin mills and cage mills), various ball mills (rotary mills, vibration mills and planetary mills) and stirring mills (bead mills, Attritor mills, flow tube type mills and annular mills).

Examples of the silicas include wet silicas (hydrous silicates), dry silicas (silicic anhydrides), calcium silicates and aluminum silicates. Among these silicas, wet silicas are preferable to attain further enhancements in processability and mechanical strength. The silicas may be used singly, or two or more may be used in combination.

To attain enhancements in processability and mechanical strength, the average particle diameter of the silica is preferably 0.5 to 200 nm, more preferably 5 to 150 nm, and still more preferably 10 to 100 nm.

The average particle diameter of the silica may be determined by measuring the diameters of the particles with a transmission electron microscope and calculating the average of the diameters.

In the rubber composition of the present invention, the content of the filler (B) with respect to 100 parts by mass of the hydrogenated nitrile rubber (A) is 5 to 100 parts by mass, preferably 10 to 90 parts by mass, and more preferably 20 to 60 parts by mass. When the content of the filler (B) is in the above range, the rubber composition attains enhancements in processability and scorch stability.

[Organic Peroxides (C)]

An organic peroxide (C) used in the present invention is a component capable of crosslinking the rubber components in the rubber composition of the present invention. Examples of the organic peroxides (C) include cyclohexanone peroxide, methyl acetoacetate peroxide, t-butyl peroxyisobutyrate, t-butyl peroxybenzoate, benzoyl peroxide, lauroyl peroxide, dicumyl peroxide, di-t-butyl peroxide and 1,3-bis(t-butylperoxyisopropyl)benzene.

The organic peroxides (C) may be used singly, or two or more may be used in combination. The content of the organic peroxide (C) is 1 to 10 parts by mass with respect to 100 parts by mass of the hydrogenated nitrile rubber (A). This content of the organic peroxide (C) ensures that crosslinked products that are obtained will attain excellent mechanical properties. To obtain crosslinked products having still higher mechanical properties, the content of the organic peroxide (C) is preferably 1 to 8 parts by mass, and more preferably 2 to 5 parts by mass with respect to 100 parts by mass of the hydrogenated nitrile rubber (A).

[Liquid Diene Rubbers (D)]

A liquid diene rubber (D) used in the present invention is a liquid polymer that includes conjugated diene units as monomer units constituting the polymer. Examples of the conjugated dienes include butadiene, isoprene; and conjugated dienes (d1) other than butadiene and isoprene, such as 2,3-dimethylbutadiene, 2-phenylbutadiene, 1,3-pentadiene, 2-methyl-1,3-pentadiene, 1,3-hexadiene, 1,3-octadiene, 1,3-cyclohexadiene, 2-methyl-1,3-octadiene, 1,3,7-octatriene, myrcene and chloroprene. The conjugated diene units contained in the liquid diene rubber (D) preferably include monomer units from isoprene and/or butadiene.

In a preferred embodiment of the liquid diene rubber (D), 50 mass % or more of all the monomer units constituting the polymer are monomer units from isoprene and/or butadiene. The total content of the isoprene units and the butadiene units is preferably 60 to 100 mass %, more preferably 70 to 100 mass %, and still more preferably 100 mass % of all the monomer units in the liquid diene rubber (D).

The liquid diene rubber (D) may include additional monomer units other than the isoprene units and the butadiene units, for example, units from the aforementioned conjugated dienes (d1) other than isoprene and butadiene, and units from aromatic vinyl compounds (d2).

Examples of the aromatic vinyl compounds (d2) include styrene, α-methylstyrene, 2-methylstyrene, 3-methylstyrene, 4-methylstyrene, 4-propylstyrene, 4-t-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Among these aromatic vinyl compounds, styrene, α-methylstyrene and 4-methylstyrene are preferable.

The content of the additional monomer units other than the butadiene units and the isoprene units in the liquid diene rubber (D) is not more than 50 mass %, more preferably not more than 45 mass %, and still more preferably not more than 40 mass %. When, for example, the rubber contains units from the aromatic vinyl compound (d2) in the above range, the processability of the rubber composition tends to be enhanced.

The liquid diene rubber (D) is preferably a polymer obtained by, for example, emulsion polymerization, solution polymerization or the like of a conjugated diene and optionally an additional monomer other than conjugated dienes.

The emulsion polymerization may be performed by a process that is known or deemed as known. For example, predetermined amounts of monomers including a conjugated diene are emulsified and dispersed in the presence of an emulsifier, and are emulsion polymerized with a radical polymerization initiator.

Examples of the emulsifiers include long-chain fatty acid salts having 10 or more carbon atoms, and rosin acid salts. Examples of the long-chain fatty acid salts include potassium salts and sodium salts of fatty acids such as capric acid, lauric acid, myristic acid, palmitic acid, oleic acid and stearic acid.

The dispersant is usually water and may include a water-soluble organic solvent such as methanol or ethanol as long as the stability during polymerization is not impaired.

Examples of the radical polymerization initiators include persulfate salts such as ammonium persulfate and potassium persulfate, organic peroxides and hydrogen peroxide.

A chain transfer agent may be used to control the molecular weight of the liquid diene rubber (D) that is obtained. Examples of the chain transfer agents include mercaptans such as t-dodecylmercaptan and n-dodecylmercaptan; carbon tetrachloride, thioglycolic acid, diterpene, terpinolene, γ-terpinene and α-methylstyrene dimer.

The temperature of the emulsion polymerization may be selected appropriately in accordance with factors such as the type of the radical polymerization initiator used, but is usually in the range of 0 to 100° C., and preferably in the range of 0 to 60° C. The polymerization mode may be continuous or batchwise.

The polymerization reaction may be terminated by the addition of a polymerization terminator. Examples of the polymerization terminators include amine compounds such as isopropylhydroxylamine, diethylhydroxylamine and hydroxylamine, quinone compounds such as hydroquinone and benzoquinone, and sodium nitrite.

The termination of the polymerization reaction may be followed by the addition of an antioxidant as required. After the termination of the polymerization reaction, the latex obtained is cleaned of the unreacted monomers as required, and the liquid diene rubber (D) is coagulated by the addition of a coagulant salt such as sodium chloride, calcium chloride or potassium chloride optionally together with an acid such as nitric acid or sulfuric acid to control the pH of the coagulated system to a predetermined value. The dispersion solvent is then separated, thereby recovering the polymer. Next, the polymer is washed with water, then dehydrated and dried. The liquid diene rubber (D) may be thus obtained. During the coagulation process, the latex may be mixed together with an emulsified dispersion of an extender oil as required, and the liquid diene rubber (D) may be recovered as an oil-extended rubber.

The solution polymerization may be performed by a process that is known or deemed as known. For example, monomers including a conjugated diene are polymerized in a solvent using a Ziegler catalyst, a metallocene catalyst, or an active metal or active metal compound capable of catalyzing anionic polymerization, optionally in the presence of a polar compound.

Examples of the solvents include aliphatic hydrocarbons such as n-butane, n-pentane, isopentane, n-hexane, n-heptane and isooctane; alicyclic hydrocarbons such as cyclopentane, cyclohexane and methylcyclopentane; and aromatic hydrocarbons such as benzene, toluene and xylene.

Examples of the active metals capable of catalyzing anionic polymerization include alkali metals such as lithium, sodium and potassium; alkaline earth metals such as beryllium, magnesium, calcium, strontium and barium; and lanthanoid rare earth metals such as lanthanum and neodymium. Among the active metals capable of catalyzing anionic polymerization, alkali metals and alkaline earth metals are preferable, and alkali metals are more preferable.

Preferred active metal compounds capable of catalyzing anionic polymerization are organoalkali metal compounds. Examples of the organoalkali metal compounds include organomonolithium compounds such as methyllithium, ethyllithium, n-butyllithium, sec-butyllithium, t-butyllithium, hexyllithium, phenyllithium and stilbenelithium; polyfunctional organolithium compounds such as dilithiomethane, dilithionaphthalene, 1,4-dilithiobutane, 1,4-dilithio-2-ethylcyclohexane and 1,3,5-trilithiobenzene; sodium naphthalenide; and potassium naphthalenide. Among these organoalkali metal compounds, organolithium compounds are preferable, and organomonolithium compounds are more preferable.

The amount in which the organoalkali metal compound is used may be determined appropriately in accordance with factors such as the melt viscosity and molecular weight of the liquid diene rubber (D), but is usually 0.01 to 3 parts by mass per 100 parts by mass of all the monomers including a conjugated diene.

The organoalkali metal compound may be used in the form of an organoalkali metal amide by being reacted with a secondary amine such as dibutylamine, dihexylamine or dibenzylamine.

Polar compounds are usually used in anionic polymerization to control the microstructure (for example, the vinyl bond content) of conjugated diene moieties without deactivating the reaction. Examples of the polar compounds include ether compounds such as dibutyl ether, tetrahydrofuran and ethylene glycol diethyl ether; tertiary amines such as N,N,N',N'-tetramethylethylenediamine and trimethylamine; alkali metal alkoxides and phosphine compounds. The polar compound is usually used in an amount of 0.01 to 1000 mol with respect to the organoalkali metal compound.

The temperature of the solution polymerization is usually in the range of −80 to 150° C., preferably in the range of 0 to 100° C., and more preferably in the range of 10 to 90° C. The polymerization mode may be batchwise or continuous.

The polymerization reaction may be terminated by the addition of a polymerization terminator. Examples of the polymerization terminators include alcohols such as methanol and isopropanol. The liquid diene rubber (D) may be isolated by pouring the polymerization reaction solution obtained into a poor solvent such as methanol to precipitate the liquid diene rubber (D), or by washing the polymerization reaction solution with water, followed by separation and drying.

Among the above processes for the production of the liquid diene rubber (D), the solution polymerization is preferable. The liquid diene rubber (D) obtained as described above may be used directly without modification or may be used after the hydrogenation of at least part of the carbon-carbon unsaturated bonds present in the liquid diene rubber. While the liquid diene rubber (D) that is used may be a modified liquid diene rubber obtained by, for example, the addition of a modifying agent or the like, it is preferable to use a liquid diene rubber that is free from any modifying agents or the like.

The weight average molecular weight (Mw) of the liquid diene rubber (D) is not less than 3,000 and not more than 120,000, preferably not less than 3,000 and not more than 80,000, more preferably not less than 3,500 and not more than 75,000, still more preferably not less than 4,000 and not more than 70,000, further preferably not less than 5,000 and not more than 60,000, still further preferably not less than 5,000 and not more than 50,000, and particularly preferably not less than 5,200 and not more than 40,000. This range of the Mw of the liquid diene rubber (D) ensures that the rubber composition of the present invention will attain good processability and enhanced scorch stability. In the present specification, the Mw of the liquid diene rubber (D) is the weight average molecular weight measured by gel permeation chromatography (GPC) relative to standard polystyrenes. In the present invention, two or more kinds of the liquid diene rubbers (D) having different molecular weights Mw may be used in combination.

The molecular weight distribution (Mw/Mn) of the liquid diene rubber (D) is preferably 1.0 to 20.0, more preferably 1.0 to 15.0, and still more preferably 1.0 to 10.0. This Mw/Mn is advantageous in that the obtainable liquid diene rubber (D) has a small variation in viscosity. The molecular weight distribution (Mw/Mn) is the ratio of weight average molecular weight (Mw) to number average molecular weight (Mn) measured by GPC relative to standard polystyrenes.

The melt viscosity of the liquid diene rubber (D) measured at 38° C. is preferably 0.1 to 4,000 Pa·s, more preferably 0.1 to 3,500 Pa·s, and still more preferably 0.1 to 3,000 Pa·s. When the melt viscosity of the liquid diene rubber (D) is in the above range, the rubber composition that is obtained attains enhanced flexibility and thus exhibits higher processability. In the present invention, the melt viscosity of the liquid diene rubber (D) is a value measured with a Brookfield viscometer at 38° C.

The glass transition temperature (Tg) of the liquid diene rubber (D) is variable depending on factors such as the vinyl bond content in the isoprene units, the butadiene units and the conjugated diene (d1) units, the types of the conjugated dienes (d1) and the content of units derived from monomers other than conjugated dienes, but is preferably −150 to 50° C., more preferably −130 to 50° C., and still more preferably −100 to 50° C. When the Tg is in this range, the increase in viscosity may be reduced and handling may be facilitated. Further, when the glass transition temperature (Tg) of the liquid diene rubber (D) is −150° C. or above, crosslinked products obtained from the rubber composition will attain enhancements in desired properties and tend to exhibit high durability.

The vinyl bond content in the liquid diene rubber (D) is preferably not more than 70 mol %, more preferably in the range of 10 to 70 mol %, and still more preferably in the range of 20 to 65 mol %. When the vinyl bond content in the liquid diene rubber (D) is in the above range, processability and mechanical properties tend to be enhanced, and excellent scorch stability tends to be obtained. The liquid diene rubber (D) is crosslinked with a peroxide at a higher reaction rate with increasing vinyl bond content. Thus, an excessively high vinyl bond content leads to a faster than desired rate of crosslinking reaction, resulting in a rubber composition that is poor in scorch stability and is also poor in processability and mechanical hardness. If, on the other hand, the vinyl bond content is too low, the liquid diene rubber (D) is not crosslinked together with the hydrogenated nitrile rubber and may bleed out. In the present invention, the "vinyl bond content" means the total molar percentage of 1,2-bonded or 3,4-bonded conjugated diene units (conjugated diene units except 1,4-bonded conjugated diene units) relative to the total of the conjugated diene units in the liquid diene rubber (D) taken as 100 mol %. The vinyl bond content may be determined by $^1$H-NMR based on the area ratio of the peaks assigned to 1,2-bonded or 3,4-bonded conjugated diene units and the peak assigned to 1,4-bonded conjugated diene units. The vinyl bond content in the liquid diene rubber (D) may be brought to the desired value by, for example, selecting the types of a solvent and an optional polar compound used in the production of the liquid diene rubber (D), or controlling the production conditions such as polymerization temperature.

The liquid diene rubbers (D) may be used singly, or two or more may be used in combination.

In the liquid diene rubber (D), the catalyst residue content ascribed to the polymerization catalyst used in the production of the rubber is preferably in the range of 0 to 200 ppm in terms of metal. When, for example, the polymerization catalyst used for the production of the liquid diene rubber (D) is an organoalkali metal such as an organolithium compound, the metal based on which the catalyst residue content is determined is the alkali metal such as lithium. The catalyst residue content in the above range ensures that a decrease in tackiness during processing or the like will be avoided and that crosslinked products obtained from the rubber composition of the present invention will be enhanced in durability. The catalyst residue content ascribed to the polymerization catalyst used in the production of the liquid diene rubber (D) is more preferably 0 to 150 ppm, and still more preferably 0 to 100 ppm in terms of metal. The catalyst residue content may be measured with, for example, a polarized Zeeman atomic absorption spectrophotometer.

For example, the catalyst residue content in the liquid diene rubber (D) may be controlled to the above specific range by purifying the liquid diene rubber to remove sufficiently the catalyst residue. The purification method is preferably washing with water or warm water, an organic solvent such as methanol or acetone, or supercritical fluid carbon dioxide. From the economic viewpoint, the number of washing operations is preferably 1 to 20 times, and more preferably 1 to 10 times. The washing temperature is preferably 20 to 100° C., and more preferably 40 to 90° C. Prior to the polymerization reaction, the monomers may be purified by distillation or with an adsorbent to remove impurities that will inhibit the polymerization. Such purification allows the polymerization to take place with a reduced amount of the polymerization catalyst, thus making it possible to reduce the catalyst residue content. From the similar viewpoint, the catalyst residue content in the rubber composition of the present invention is preferably 0 to 200 ppm, more preferably 0 to 150 ppm, and still more preferably 0 to 100 ppm in terms of metal. In this case, the catalyst residue content may include a catalyst residue content ascribed to the polymerization catalyst used in the production of the hydrogenated nitrile rubber (A), the liquid diene rubber (D) and/or other components optionally used in the rubber composition.

In the rubber composition of the present invention, the content of the liquid diene rubber (D) with respect to 100 parts by mass of the hydrogenated nitrile rubber (A) is 1 to 20 parts by mass, preferably 3 to 15 parts by mass, and more preferably 3 to 8 parts by mass. When the content of the liquid diene rubber (D) is in the above range, the rubber composition exhibits good processability and attains enhanced scorch stability.

Where necessary, the rubber composition of the present invention may include a softener in order to attain improvements in properties such as processability and flowability while still ensuring that the advantageous effects of the invention are not impaired. Examples of the softeners include process oils such as silicone oils, aromatic oils, TDAEs (treated distilled aromatic extracts), MESs (mild extracted solvates), RAEs (residual aromatic extracts), paraffin oils and naphthenic oils, ester oils such as phthalate plasticizers, sebacate plasticizers and adipate plasticizers, and resin components such as aliphatic hydrocarbon resins, alicyclic hydrocarbon resins, C9 resins, rosin resins, coumarone-indene resins and phenolic resins. When the rubber composition of the present invention contains the process oil as the softener, the content thereof is preferably less than 50 parts by mass per 100 parts by mass of the hydrogenated nitrile rubber (A). In a preferred embodiment of the present invention, the rubber composition of the present invention is free from plasticizers. Plasticizers generally have a low molecular weight and may bleed out. In the present invention, the liquid diene rubber (D) serves as a plasticizer during kneading. The liquid diene rubber (D) of the present invention can form a crosslinked structure together with the hydrogenated nitrile rubber and thus does not cause the bleed out problem.

The rubber composition of the present invention may contain additives as required in order to attain enhancements in properties such as weather resistance, heat resistance and oxidation resistance, while still achieving the advantageous effects of the invention. Examples of such additives include antioxidants, waxes, oxidation inhibitors, lubricants, light stabilizers, scorch inhibitors, processing aids, colorants such as pigments and coloring matters, flame retardants, antistatic agents, matting agents, antiblocking agents, UV absorbers, release agents, foaming agents, antibacterial agents, mildew-proofing agents and perfumes. Examples of the oxidation inhibitors include hindered phenol compounds, phosphorus compounds, lactone compounds and hydroxyl compounds. Examples of the antioxidants include amine-ketone compounds, imidazole compounds, amine compounds, phenolic compounds, sulfur compounds and phosphorus compounds. The additives may be used singly, or two or more may be used in combination.

Further, the rubber composition of the present invention may include a solid rubber other than the hydrogenated nitrile rubbers (A) as long as the advantageous effects of the present invention are not impaired.

[Methods for Producing Rubber Compositions]

The rubber composition of the present invention may be produced by any methods without limitation as long as the components described hereinabove can be mixed together homogeneously. Examples of the apparatuses used in the production of the rubber composition include tangential or intermeshing internal kneaders such as kneader-ruders, Brabender mixers, Banbury mixers and internal mixers, single-screw extruders, twin-screw extruders, mixing rolls and rollers. The production of the rubber composition may be usually carried out at a temperature in the range of 70 to 270° C.

[Crosslinked Products]

A crosslinked product may be obtained by crosslinking the rubber composition of the present invention. The conditions for the crosslinking of the rubber composition may be selected appropriately in accordance with the use application or other factors.

When the rubber composition is crosslinked in a mold using the organic peroxide as a crosslinking agent, the crosslinking temperature may be usually 100 to 200° C. and the pressure conditions during the crosslinking may be usually 0.5 to 2.0 MPa.

The rubber composition of the present invention is excellent in processability and scorch stability and does not suffer deterioration in superior characteristics of the hydrogenated nitrile rubber, thus finding use in various applications.

Crosslinked products obtained from the rubber composition of the present invention may be suitably used in various applications such as, for example, gaskets, O-rings, oil seals, hoses and belts.

EXAMPLES

Hereinbelow, the present invention will be described in greater detail based on Examples. However, it should be construed that the scope of the present invention is not limited to such Examples.

The components used in Examples and Comparative Examples are as follows.

⟨Hydrogenated nitrile rubber (A)⟩
Zetpol 2020 (manufactured by Zeon Corporation)
(Acrylonitrile unit content: 36.2%, iodine value: 28, Mooney viscosity: 78)
<Filler (B)>
Carbon black: SEAST G-SO (manufactured by Tokai Carbon Co., Ltd.)
<Organic Peroxide (C)>
Perbutyl P (manufactured by NOF CORPORATION)
<Liquid Diene Rubbers (D)>
Liquid diene rubbers obtained in Production Examples 1 to 5 described later
<Optional Components>
Crosslinking coagent: Acrylic Ester TMP (manufactured by Mitsubishi Chemical Corporation)
Plasticizer: BAX-R (manufactured by DAIHACHI CHEMICAL INDUSTRY CO., LTD.)
Antioxidant: NOCRAC 224 (manufactured by OUCHI SHINKO CHEMICAL INDUSTRIAL CO., LTD.)

Production Example 1: Production of Liquid Diene Rubber (D-1)

A thoroughly dried 5 L autoclave was purged with nitrogen and was charged with 1100 g of hexane and 204 g of n-butyllithium (a 17 mass % hexane solution). The temperature was increased to 50° C. While performing stirring, 10 g of N,N,N',N'-tetramethylethylenediamine and 1300 g of butadiene were sequentially added, and polymerization was performed for 1 hour while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (D-1). Properties of the liquid diene rubber (D-1) are described in Table 1.

Production Example 2: Production of Liquid Diene Rubber (D-2)

A thoroughly dried 5 L autoclave was purged with nitrogen and was charged with 1100 g of hexane and 33 g of n-butyllithium (a 17 mass % hexane solution). The temperature was increased to 50° C. While performing stirring, 2.2 g of N,N,N',N'-tetramethylethylenediamine and 1320 g of butadiene were sequentially added, and polymerization was performed for 1 hour while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (D-2). Properties of the liquid diene rubber (D-2) are described in Table 1.

Production Example 3: Production of Liquid Diene Rubber (D-3)

A thoroughly dried 5 L autoclave was purged with nitrogen and was charged with 1100 g of hexane and 204 g of n-butyllithium (a 17 mass % hexane solution). The temperature was increased to 50° C. While performing stirring, 1300 g of butadiene was sequentially added, and polymerization was performed for 1 hour while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (D-3). Properties of the liquid diene rubber (D-3) are described in Table 1.

Production Example 4: Production of Liquid Diene Rubber (D-4)

A thoroughly dried 5 L autoclave was purged with nitrogen and was charged with 1280 g of cyclohexane and 204 g of s-butyllithium (a 10.5 mass % cyclohexane solution). The temperature was increased to 50° C. While performing stirring, 1350 g of butadiene was sequentially added, and polymerization was performed for 1 hour while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (D-4). Properties of the liquid diene rubber (D-4) are described in Table 1.

Production Example 5: Production of Liquid Diene Rubber (D-5)

A thoroughly dried 5 L autoclave was purged with nitrogen and was charged with 1100 g of cyclohexane and 54 g of s-butyllithium (a 10.5 mass % cyclohexane solution). The temperature was increased to 50° C. While performing stirring, 5.1 g of N,N,N',N'-tetramethylethylenediamine and 450 g of a mixture of butadiene and styrene prepared beforehand (by mixing 360 g of butadiene and 90 g of styrene in a tank) were sequentially added, and polymerization was performed for 1 hour while controlling the polymerization temperature at 50° C. Thereafter, methanol was added to terminate the polymerization reaction. A polymer solution was thus obtained. Water was added to the polymer solution obtained, and the mixture was stirred to wash the polymer solution with water. The stirring was terminated. After the liquid had separated into the polymer solution phase and the aqueous phase, the water was removed. After the completion of washing, the polymer solution was vacuum dried at 70° C. for 24 hours to afford a liquid diene rubber (D-5). Properties of the liquid diene rubber (D-5) are described in Table 1.

Properties of the liquid diene rubbers obtained in Production Examples were measured and calculated by the following methods.

(Method for Measuring Weight Average Molecular Weight)

The weight average molecular weight of the liquid diene rubbers (D) was measured by GPC relative to standard polystyrenes. The measurement involved the following apparatus and conditions.

Apparatus: GPC apparatus "GPC8020" manufactured by TOSOH CORPORATION

Separation column: "TSKgel G4000HXL" manufactured by TOSOH CORPORATION

Detector: "RI-8020" manufactured by TOSOH CORPORATION

Eluent: Tetrahydrofuran

Eluent flow rate: 1.0 mL/min

Sample concentration: 5 mg/10 mL

Column temperature: 40° C.

(Vinyl Bond Content)

The vinyl bond content in the liquid diene rubbers (D) was measured with $^1$H-NMR (500 MHz) manufactured by JEOL Ltd. The concentration was sample/deuterated chloroform=50 mg/1 mL. The number of scans was 1024. With respect to the spectrum obtained, the vinyl bond content was calculated from the ratio of the area of the double-bond peak assigned to the vinylated diene compound to the area of the double-bond peak assigned to the non-vinylated diene compound.

(Glass Transition Temperature)

A 10 mg portion of the liquid diene rubber (D) was placed into an aluminum pan and was analyzed by differential scanning calorimetry (DSC) at a heat-up rate of 10° C./min. With respect to the thermogram obtained, the peak top value of the DDSC curve was adopted as the glass transition temperature.

(Method for Measuring Melt Viscosity at 38° C.)

The melt viscosity of the liquid diene rubbers (D) at 38° C. was measured with a Brookfield viscometer (manufactured by BROOKFIELD ENGINEERING LABS. INC.).

TABLE 1

| Liquid diene rubbers | Proportions of structural units in liquid diene rubber | | Weight average molecular weight (×10³) | Vinyl bond content (mol %) | Tg (° C.) | Melt viscosity (38° C.) (Pa · s) |
|---|---|---|---|---|---|---|
| | Butadiene content (mass %) | Styrene units (mass %) | | | | |
| Liquid diene rubber (D-1) | 100 | | 5.5 | 65 | −49 | 5.5 |
| Liquid diene rubber (D-2) | 100 | | 30 | 65 | −42 | 360 |
| Liquid diene rubber (D-3) | 100 | | 5.5 | 20 | −92 | 0.6 |
| Liquid diene rubber (D-4) | 100 | | 26 | 10 | −95 | 40 |
| Liquid diene rubber (D-5) | 80 | 20 | 8.5 | 65 | −14 | 350 |

Examples 1 to 6 and Comparative Examples 1 and 2

The hydrogenated nitrile rubber (A), the filler (B), the organic peroxide (C), the liquid diene rubber (D), the crosslinking coagent, the plasticizer and the antioxidant were kneaded together in the amounts (parts by mass) described in Table 2 using an open roll mill to give an uncrosslinked rubber sheet. The uncrosslinked rubber sheet obtained was tested by the following methods to evaluate the Mooney viscosity, the scorch time $t_5$ and the 90% crosslinking time $t_c$ (90). The results are described in Table 2.

The uncrosslinked rubber sheet obtained was pressed (180° C., 7 minutes) to form a crosslinked rubber sheet (2 mm in thickness) and was tested by the methods described later to evaluate the hardness, the tensile strength and the elongation at break. The results are described in Table 2.

The measurement methods for the evaluations are as follows.
(Mooney Viscosity $ML_{1+4}$, 100° C.)

The uncrosslinked rubber sheets prepared in Examples and Comparative Examples were tested in accordance with JIS K 6300 using an L-shaped rotor under conditions where the preheating time was 1 minute, the rotor operating time was 4 minutes and the temperature was 100° C.

(Mooney Scorch Time $t_5$)

The uncrosslinked rubber sheets prepared in Examples and Comparative Examples were tested in accordance with JIS K 6300 to measure the Mooney scorch time $t_5$ (min) at 125° C.

(90% Crosslinking time $t_c$ (90))

The uncrosslinked rubber sheets prepared in Examples and Comparative Examples were tested in accordance with JIS K 6300 to measure the 90% crosslinking time $t_c$ (90) (min) at 170° C.

(Hardness)

The crosslinked rubber sheets obtained were tested in accordance with JIS K 6253 using a type A hardness meter to determine the hardness. The results of Examples and Comparative Examples are indicated as values relative to the value of Comparative Example 1 in Table 2 taken as 100.

(Tensile Strength and Elongation at Break)

The crosslinked rubber sheets obtained were punched to give dumbbell-shaped test pieces, which were then tested using an INSTRON tensile tester to measure the tensile strength and the elongation at break in accordance with JIS K 6251. The results of Examples and Comparative Examples are indicated as values relative to the value of Comparative Example 1 in Table 2 taken as 100.

TABLE 2

| | | | Examples | | | | | | Comparative Examples | |
|---|---|---|---|---|---|---|---|---|---|---|
| | | | 1 | 2 | 3 | 4 | 5 | 6 | 1 | 2 |
| Amounts (parts by mass) | Component (A) | Hydrogenated nitrile rubber | 100 | 100 | 100 | 100 | 100 | 100 | 100 | 100 |
| | Component (B) | Carbon black | 40 | 40 | 40 | 40 | 40 | 40 | 40 | 40 |
| | Component (C) | Organic peroxide | 3 | 3 | 3 | 3 | 3 | 3 | 3 | 3 |
| | Components (D) | Liquid diene rubber (D-1) | 5 | 10 | | | | | | |
| | | Liquid diene rubber (D-2) | | | 5 | | | | | |
| | | Liquid diene rubber (D-3) | | | | 5 | | | | |
| | | Liquid diene rubber (D-4) | | | | | 5 | | | |
| | | Liquid diene rubber (D-5) | | | | | | 5 | | |
| | Optional components | Crosslinking coagent | | | | | | | 3 | |
| | | Plasticizer | | | | | | | 5 | 5 |
| | | Antioxidant | 1 | 1 | 1 | 1 | 1 | 1 | 1 | 1 |
| Properties | Mooney viscosity $ML_{1+4}$, 100° C. | | 92 | 64 | 91 | 90 | 89 | 87 | 77 | 86 |
| | Mooney scorch time $t_5$ (min) | | 31 | 43 | 28 | 28 | 27 | 33 | 6 | 22 |
| | 90% Crosslinking time $t_c$ (90) (min) | | 4.2 | 4.2 | 7.9 | 7.4 | 7.3 | 7.6 | 6.9 | 7.4 |
| | Hardness (relative values) | | 111 | 115 | 111 | 103 | 104 | 110 | 100 | 100 |
| | Tensile strength (relative values) | | 122 | 104 | 113 | 105 | 102 | 103 | 100 | 105 |
| | Elongation at break (relative values) | | 82 | 71 | 100 | 110 | 103 | 90 | 100 | 110 |

From Table 2, it has been shown that the rubber compositions of Examples 1 to 6 are comparable in 90% crosslinking time and are excellent in scorch stability. Further, they have high levels of hardness, tensile strength and elongation at break.

INDUSTRIAL APPLICABILITY

The rubber compositions of the present invention are excellent in processability and scorch stability, and still exhibit superior characteristics of the hydrogenated nitrile rubber without deterioration. Thus, the rubber compositions may be suitably used in numerous applications such as industrial members.

The invention claimed is:

1. A rubber composition comprising 100 parts by mass of a hydrogenated nitrile rubber (A), 5 to 100 parts by mass of a filler (B), 1 to 10 parts by mass of an organic peroxide (C), and 1 to 20 parts by mass of a liquid diene rubber (D) having a polystyrene-equivalent weight average molecular weight of 5,200 to 120,000 as measured by gel permeation chromatography (GPC),
wherein the vinyl bond content in the liquid diene rubber (D) is in the range of 10 to 70 mol %,
the diene rubber (D) has not been hydrogenated, and
the liquid diene rubber (D) is not modified with any modifying agents.

2. A crosslinked product of the rubber composition described in claim 1.

3. The rubber composition according to claim 1, wherein the liquid diene rubber (D) has a polystyrene-equivalent weight average molecular weight of 5,200 to 40,000 as measured by GPC.

* * * * *